(12) United States Patent
Kim

(10) Patent No.: US 7,144,009 B2
(45) Date of Patent: Dec. 5, 2006

(54) APPARATUS FOR TRANSMITTING A WORKPIECE

(75) Inventor: Jun Man Kim, Suwon (KR)

(73) Assignee: Kia Motors Corporation, Seocho-Ku (KR)

( * ) Notice: Subject to any disclaimer, the term of this patent is extended or adjusted under 35 U.S.C. 154(b) by 176 days.

(21) Appl. No.: 11/006,188

(22) Filed: Dec. 7, 2004

(65) Prior Publication Data

US 2006/0000690 A1    Jan. 5, 2006

(30) Foreign Application Priority Data

Jun. 30, 2004   (KR)  ...................... 10-2004-0050085

(51) Int. Cl.
*B65H 5/02*   (2006.01)

(52) U.S. Cl. ...................... 271/276; 271/11; 198/471.1; 414/796.5; 414/797.7

(58) Field of Classification Search ................ 271/276, 271/11; 198/471.1; 414/796.5, 797, 797.7, 414/793, 797.2
See application file for complete search history.

(56) References Cited

U.S. PATENT DOCUMENTS

| | | | | |
|---|---|---|---|---|
| 3,912,253 A | * | 10/1975 | Jarman | 271/5 |
| 3,980,292 A | * | 9/1976 | Sakurai | 271/11 |
| 4,513,957 A | * | 4/1985 | Schaefer, Jr. | 271/90 |
| 5,064,183 A | * | 11/1991 | Nishigaki et al. | 271/11 |
| 5,232,213 A | * | 8/1993 | Parsons et al. | 271/95 |
| 5,431,384 A | * | 7/1995 | Obermiller et al. | 271/11 |
| 5,848,785 A | * | 12/1998 | Hardwick et al. | 271/11 |

* cited by examiner

*Primary Examiner*—Joe Dillon, Jr.
(74) *Attorney, Agent, or Firm*—Morgan Lewis & Bockius LLP (57) ABSTRACT

The apparatus for transmitting a workpiece along a press line includes a support frame; a support frame driving unit; a plurality of air pipes; an air flow forming unit; a plurality of rollers; and a roller driving unit. The plurality of suction cups are provided at a perimeter of each of the rollers A plurality of air exhaust passages extends from an inner surface of each suction cup to a respective air passage are formed in each of the rollers, such that air within a closed space formed between the suction cup and the workpiece is exhausted to the air passage by a difference between a pressure within the closed space and a pressure in the air passage.

14 Claims, 7 Drawing Sheets

APPARATUS FOR TRANSMITTING A WORKPIECE

CROSS REFERENCE TO RELATED APPLICATION

This application claims priority to Korean Application No. 10-2004-0050085, filed on Jun. 30, 2004, the disclosure of which is incorporated herein by reference.

TECHNICAL FIELD OF THE INVENTION

The present invention relates to an apparatus for transferring a workpiece along a press line.

BACKGROUND OF THE INVENTION

A workpiece transmitting apparatus for a press line is a device for lifting a workpiece and then inserting the lifted workpiece into a press device. Conventional workpiece transmitting apparatuses that are designed for steel workpieces include a vacuum cylinder and a magnetic belt conveyor. The vacuum cylinder is movable upward and downward, and is configured to adhere to a workpiece panel by forming a vacuum therewith.

If the vacuum cylinder descends to contact a workpiece panel, the workpiece panel adheres to the vacuum cylinder by a force generated by a vacuum of the vacuum cylinder. Then, the vacuum cylinder ascends while adhering to the workpiece panel, and the workpiece panel adheres to the magnetic belt conveyor by a magnetic force. If the magnetic belt conveyor operates in a state that the workpiece panel sticks to the magnetic belt conveyor, the workpiece panel is inserted into a device of a press line (e.g., a washing device).

Because in conventional workpiece transmitting apparatuses the workpiece panel is attached to the magnetic belt conveyor by a magnetic force, these conventional workpiece transmitting apparatuses can only be used for workpieces made of steel. Therefore, such a conventional workpiece transmitting apparatus cannot be used for transmitting aluminum workpieces.

Although apparatuses for transmitting non-steel material workpieces, such as aluminum workpieces, have been developed, such apparatuses have very complicated structures and are also very expensive.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention provides a workpiece transmitting device that is capable of transmitting a workpiece that is made of a non-magnetic material and has a simple overall structure. An exemplary apparatus for transmitting a workpiece along a press line according to an embodiment of the present invention includes: a support frame; a support frame driving unit; a plurality of air pipes; an air flow forming unit; a plurality of rollers; and a roller driving unit. The support frame driving unit moves the support frame upwardly and downwardly. The plurality of air pipes are rotatably connected to the support frame along a direction perpendicular to a transmitting direction of the workpiece. Each air pipe defines an air passage. The air flow forming unit generates an air flow in the air passage. The plurality of rollers are coupled to each of the air pipes to rotate with that air pipe. The roller driving unit rotates the rollers. A plurality of suction cups are provided on an outer surface or at a perimeter of each of the rollers and a plurality of air exhaust passages extending from an inner surface of each suction cup to an air passage formed in each of the rollers. Air within a closed space formed between the suction cup and the workpiece is exhausted to the air passage by a difference between a pressure within the closed space and a pressure in the air passage. The plurality of suction cups may be equidistantly disposed on an outer surface of the roller.

A sectional area of the air passage at a portion to which the air exhaust passage is connected may be less than a sectional area of the air passage around the portion. The roller driving unit may rotate the plurality of rollers by rotating the plurality of air pipes. In another embodiment of the present invention, the apparatus may further comprise a plurality of guide rollers disposed between the rollers for guiding the workpiece. Each of the guide rollers may be connected through a spring to an auxiliary frame that is connected to the support frame.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, an embodiment of the present invention will be described in detail with reference to the accompanying drawings.

Figure 1:
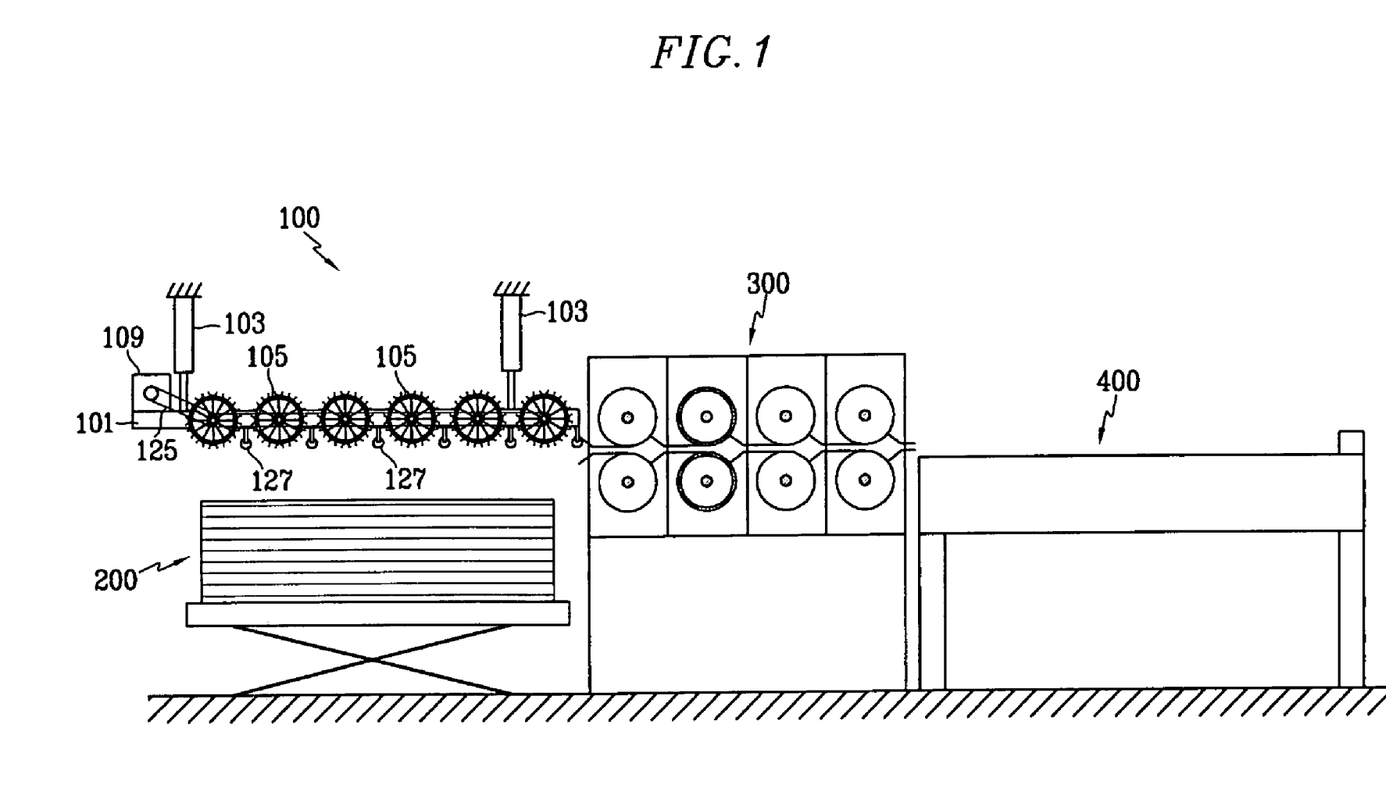
FIG. 1 shows an apparatus for transmitting a workpiece, according to an embodiment of the present invention.

With reference to FIG. 1, a workpiece transmitting apparatus 100 according to an embodiment of the present invention may be used on a press line for press-forming a workpiece 200. For example, the workpiece transmitting apparatus 100 according to an embodiment of the present invention can be disposed near a washing device 300 and a centering device 400 to insert the workpiece 200. More concretely, the workpiece transmitting apparatus 100 according to an embodiment of the present invention may be used to lift the workpiece 200 from stacked workpieces and insert the lifted workpiece 200 into the washing device 300.

Figure 2:
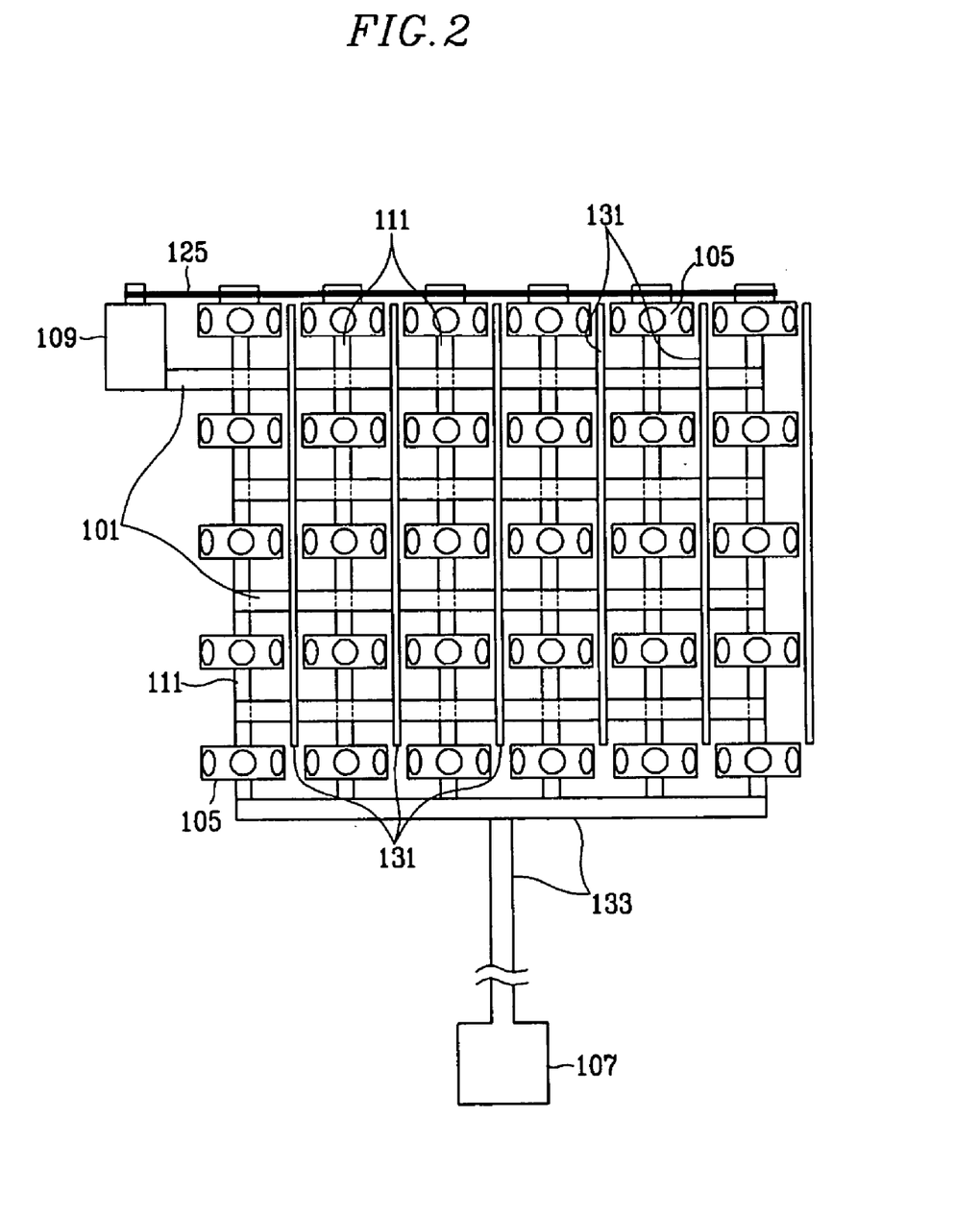
FIG. 2 is a top plan view of an apparatus for transmitting a workpiece, according to an embodiment of the present invention.

With reference to FIGS. 1 and 2, the workpiece transmitting apparatus 100 according to an embodiment of the present invention includes: a support frame 101; a support frame driving unit 103; a plurality of rollers 105; an air flow forming unit 107; a roller driving unit 109; and a plurality of air pipes 111.

The support frame driving unit 103 moves the support frame 101 upwardly and downwardly. For example, the support frame driving unit 103 can be an air cylinder device, a hydraulic cylinder device, or any other suitable actuator(s).

The air pipes 111 are rotatably connected to the support frame 101 along a direction perpendicular to a transmitting direction of the workpiece 200. The plurality of rollers are coupled to each of the plurality of air pipes 111 to rotate together with the air pipes 111.

Figure 3:
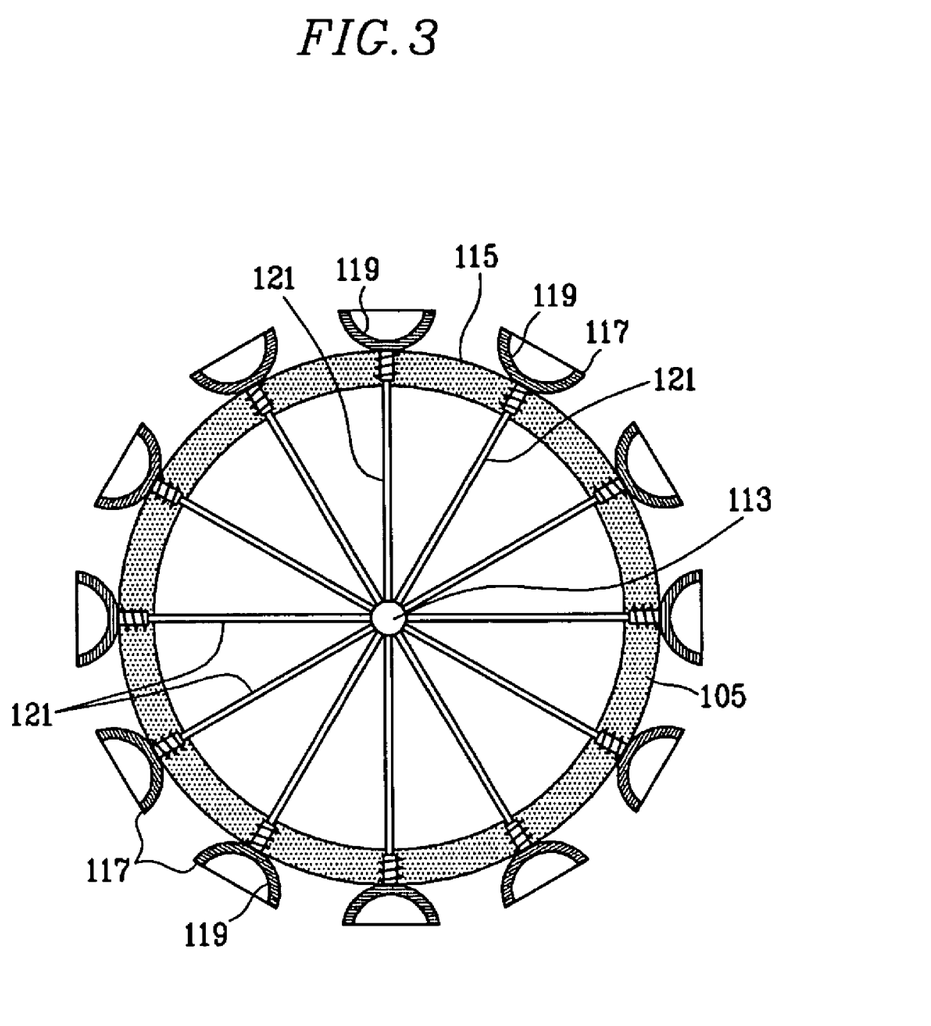
FIG. 3 is a sectional view of a roller along line A—A in FIG. 2.
Figure 4:
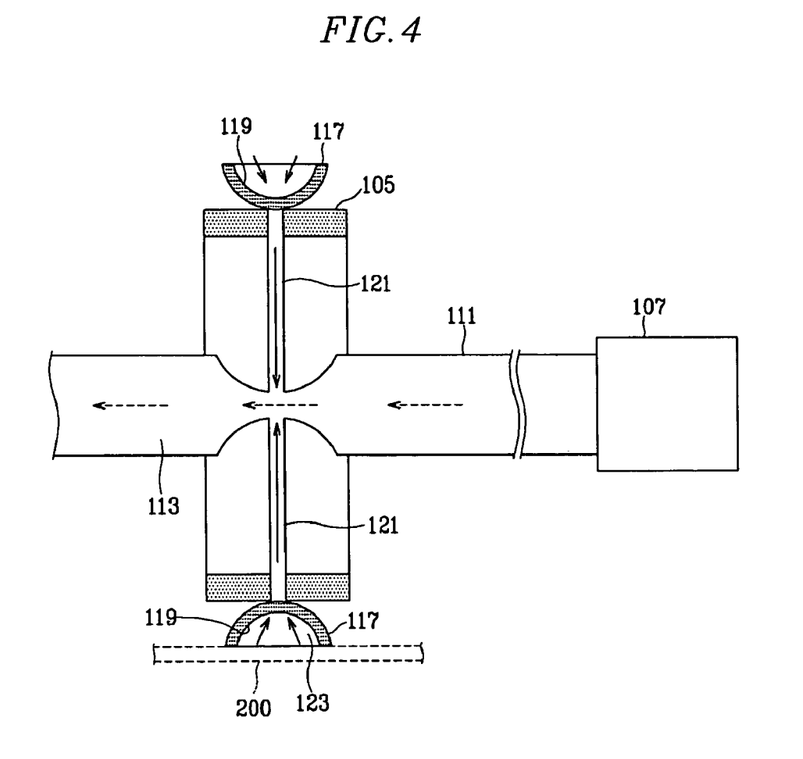
FIG. 4 is a sectional view of a roller along line B—B in FIG. 2.

As shown in FIGS. 3 and 4, each of the air pipes 111 defines an air passage 113 therein. The air flow forming unit 107 forms an air flow in the air passage 113 in the air pipe 111. The air flow forming unit 107 can be any device for forming an air flow. For example, the air flow forming unit 107 can be an air compressor for pressurizing air and transmitting the pressurized air. The plurality of air pipes 111 can be connected through an air supply pipe 133 to the air flow forming unit 107.

One end of the air passage 113 is connected to the air flow forming unit 107 and the other end of the air passage 113 is open. Accordingly, when the air flow forming unit 107 operates, an air flow in a direction of a broken arrow in FIG. 4 is generated.

A plurality of suction cups 117, which may be called vacuum cups, are provided on an outer surface 115 of each roller 105. Each suction cup 117 can be made of any material that is suitable for forming a vacuum therein. For example, the suction cup 117 can be made of rubber material.

The plurality of suction cups 117 may be equidistantly disposed on the outer surface 115 of the roller 105. If the suction cups 117 are equidistantly disposed, the workpiece 200 will be stably sucked onto the suction cups 117.

A plurality of air exhaust passages 121 extending from an inner surface 119 of the suction cup 117 to the air passage 113 of the air pipe 111 are formed in each of the rollers 105.

As shown in FIG. 4, a sectional area of the air passage 113 at a portion to which the air exhaust passage 121 is connected (the throat) is less than a sectional area of the air passage 121 around that portion, thereby forming a venturi tube. If air flows in the direction of the broken arrow in the air passage 113 from air flow forming unit 107, the pressure in the air passage 113 becomes lower. Accordingly, a pressure difference between a pressure of air in the air passage 113 and a pressure of air within a closed space 123 formed between the suction cup 117 and the workpiece 200 occurs. Accordingly, air within the closed space 123 is exhausted through the air exhaust passage 121 and into air passage 113. Consequently, the workpiece 200 is adhered to the suction cup 117.

In addition, because a sectional area of the air passage 113 at a portion to which the air exhaust passage 121 is connected is less than a sectional area of the air passage 121 around that portion, a speed of air flow at the portion to which the air exhaust passage 121 is connected becomes faster than a speed of air flow near that portion. Therefore, a pressure of air at the portion to which the air exhaust passage 121 is connected becomes lower than a pressure of air near that portion. Accordingly, because a pressure difference between a pressure of air in the portion of the air passage 113 to which the air exhaust passage 121 is connected and a pressure of air within the closed space 123 formed between the suction cup 117 and the workpiece 200 increases, the workpiece 200 is firmly adhered to the suction cup 117.

The roller driving unit that rotates the rollers 105 may rotate the rollers 105 by rotating the plurality of air pipes 111. However, it is also possible that the roller driving unit 109 directly rotates the rollers 105. The roller driving unit 109 may include a motor, and by connecting a rotating shaft of the motor to the plurality of air pipes 111 through a driving belt 125, the air pipes 111 can be rotated by an operation of the roller driving unit 109.

Figure 5:
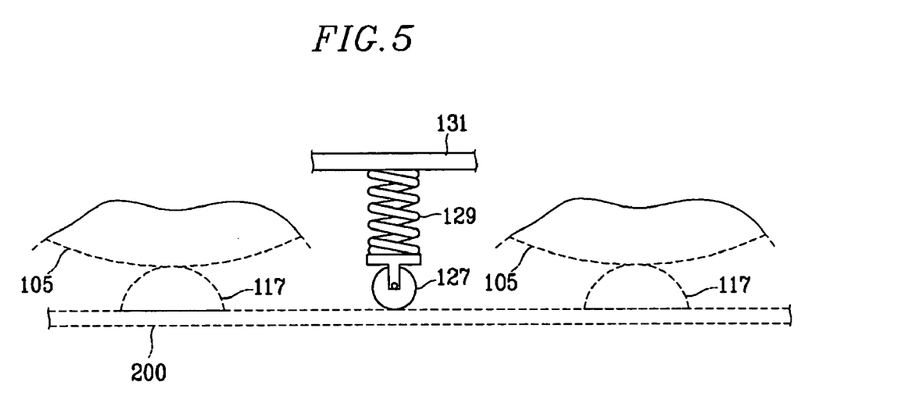
FIG. 5 shows a guide roller of an apparatus for transmitting a workpiece, according to an embodiment of the present invention.

As shown in FIG. 5, the workpiece transmitting device 100 according to an embodiment of the present invention may further comprise a plurality of guide rollers 127 that are disposed between the rollers and guides the work piece 200. Each guide roller 127 may be connected through a spring 129 to an auxiliary frame 131 that is connected to the support frame 101. The guide roller may be made of a rubber material. The guide roller 127 contacts the workpiece 200 in a state that the workpiece 200 is adhered to the suction cup 117, so that the guide roller 127 guides a transmission of the workpiece 200.

Figure 6:
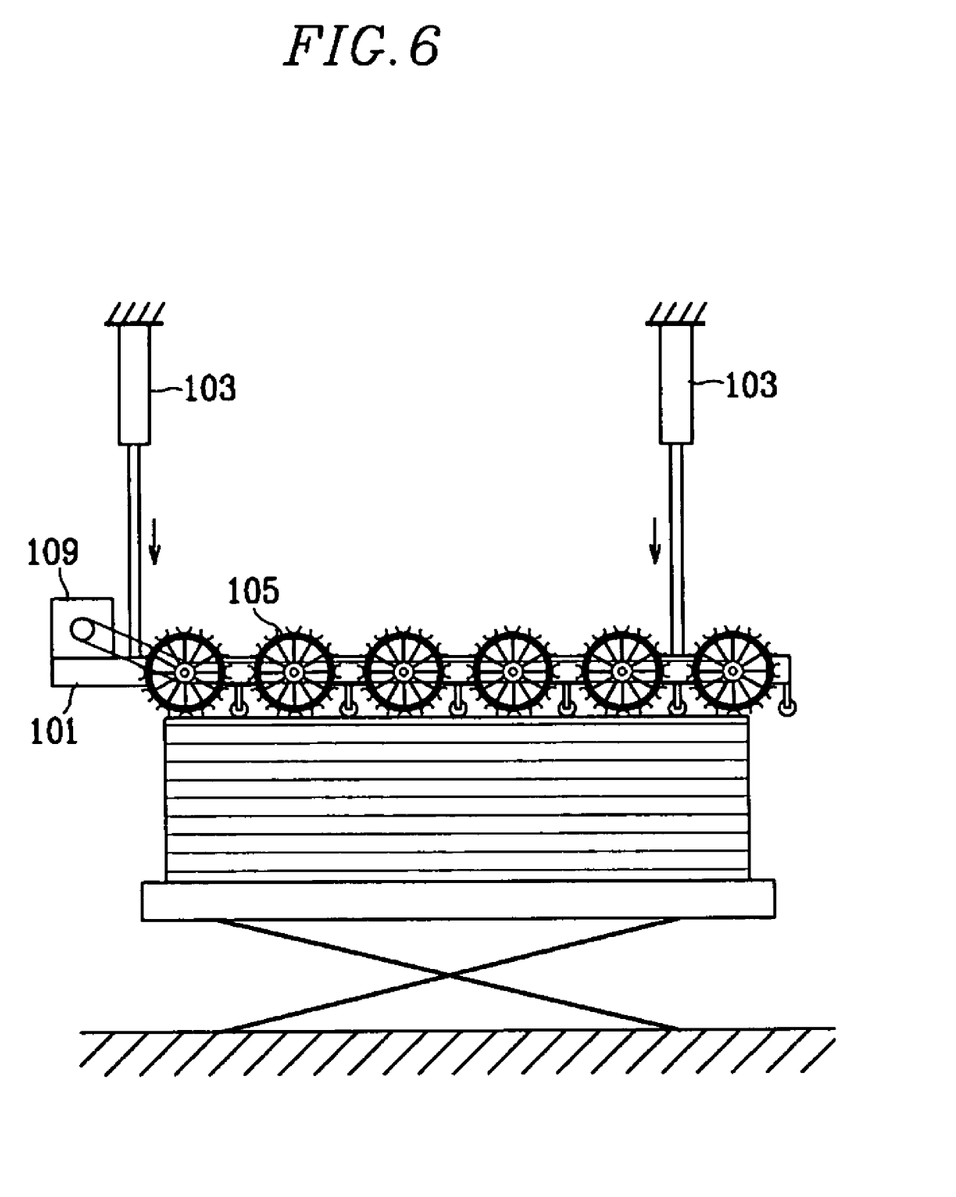
FIGS. 6 to 8 show operations of an apparatus for transmitting a workpiece, according to an embodiment of the present invention.
Figure 7:
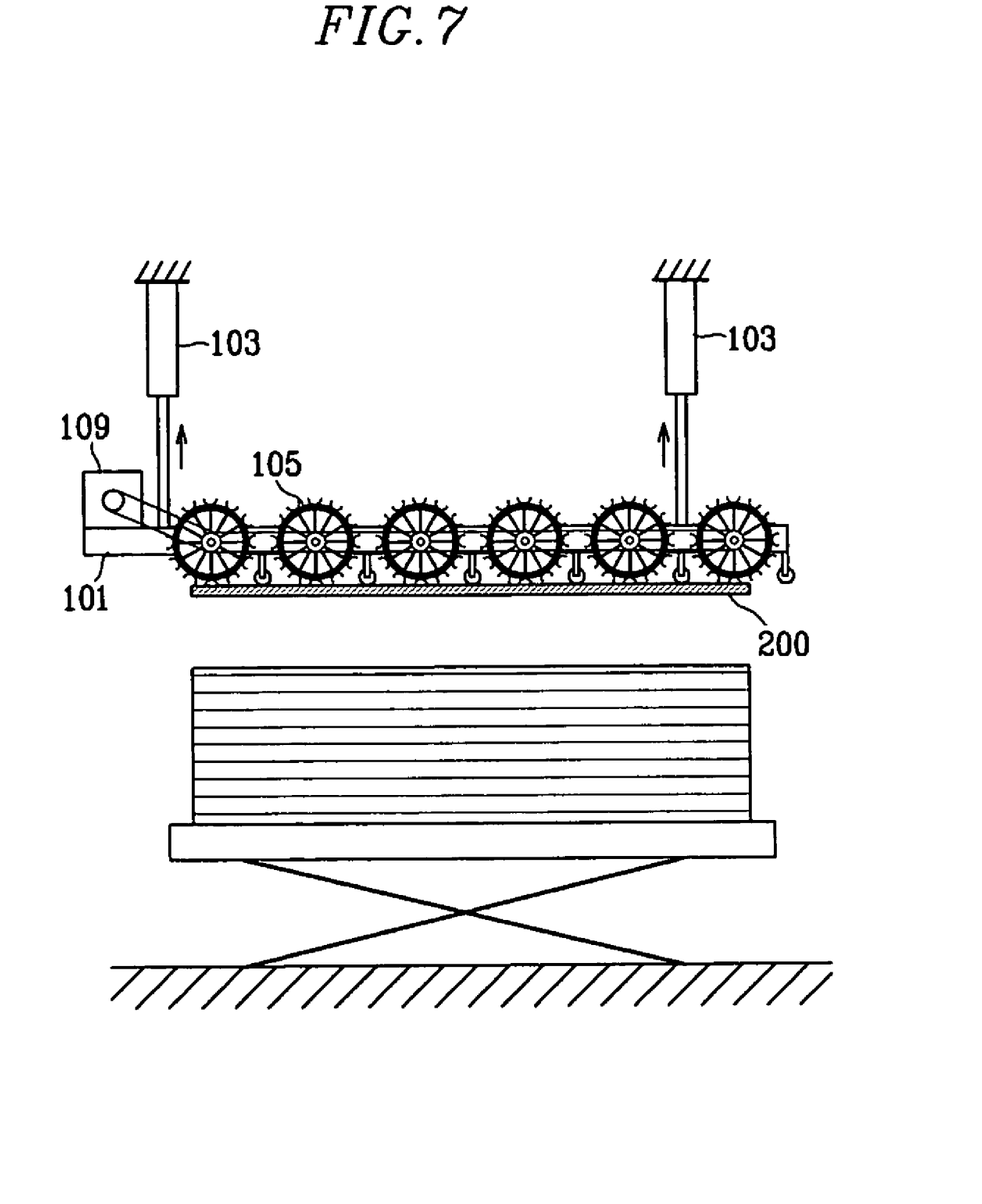

Hereinafter, referring to FIGS. 6 to 8, operations of the workpiece transmitting device 100 according to an embodiment of the present invention will be explained. As shown in FIG. 6, the support frame 101 is lowered by operation of the support frame driving unit 103 so that a suction cup 117 of each roller 105 contacts the workpiece 200. The air flow forming unit 107 operates to exhaust air from the closed space formed by the contact of the suction cup 117 and the workpiece 200. This causes the workpiece 200 to adhere to the suction cup 117. Then, as shown in FIG. 7, the support frame 101 ascends by operation of the support frame driving unit 103.

Figure 8:
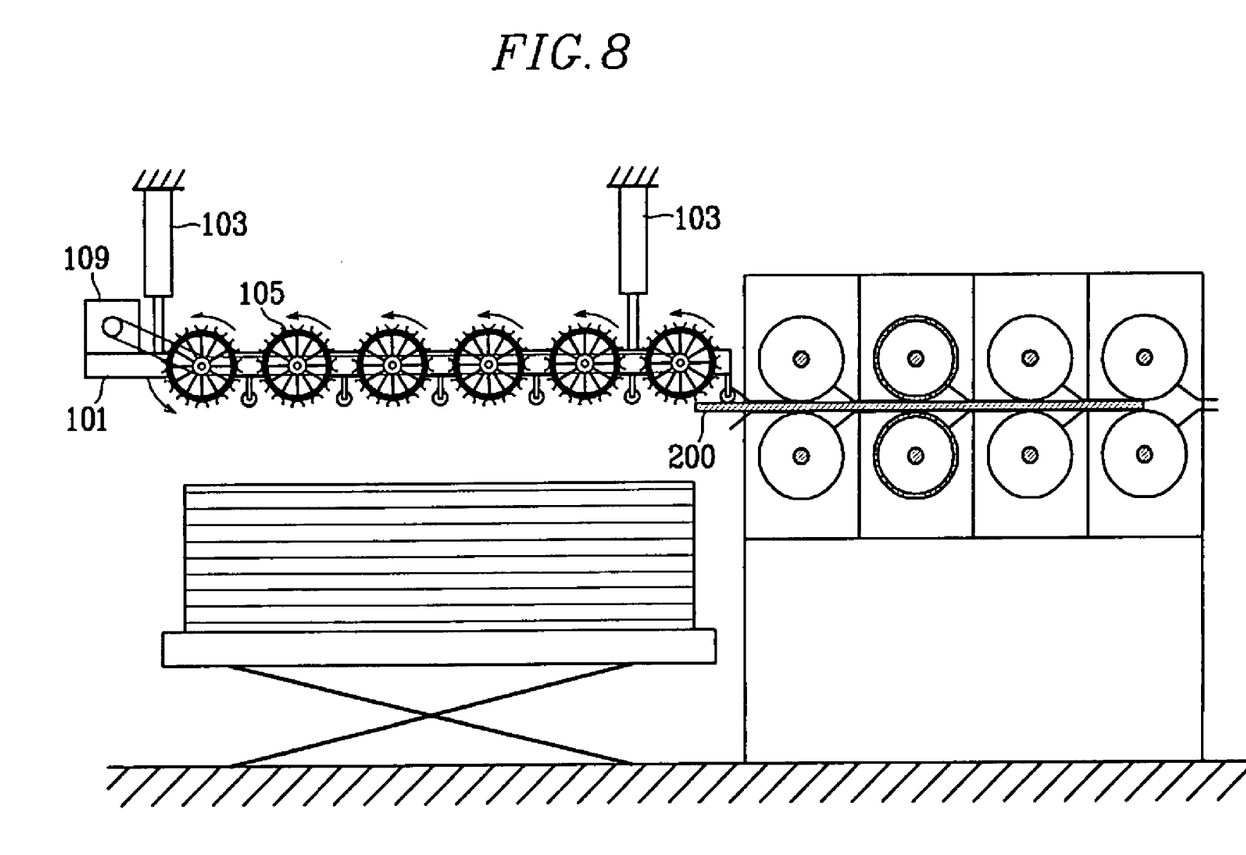

Subsequently, as shown in FIG. 8, the roller 105 rotates counter clock wise in FIG. 8 by operation of the roller driving unit 109. This causes the workpiece 200 to be transmitted to next process of a press line.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

According to an embodiment of the present invention, since the workpiece transmitting device forms a vacuum to adhere to a workpiece and transmits the workpiece by rotating a roller, it can be used to transmit a workpiece that is made of a non-ferrous material, i.e., a material that does not stick to a magnet. In addition, the workpiece transmitting device according to an embodiment of the present invention utilizes air pressure so that an overall structure thereof is very simple.

Further, the workpiece transmitting device according to an embodiment of the present invention simultaneously performs adhering and transmitting a workpiece, so that an efficiency of the press line can be improved.

What is claimed is:

1. An apparatus for transmitting a workpiece, comprising:
   a support frame;
   a support frame driving unit for moving the support frame towards and away from a workpiece;
   a plurality of air pipes rotatably connected to the support frame along a direction perpendicular to a transmitting direction of the workpiece, where each air pipe defines an air passage;
   an air flow forming unit configured to generate air flow in each air passage;

a plurality of rollers coupled to each of the air pipes and configured to rotate with the air pipes; and a roller driving unit configured to rotate the rollers, wherein a plurality of suction cups are provided at an outer perimeter of each of the rollers and a plurality of air exhaust passages each extending from an inner surface of each suction cup to a respective air passage in each of the rollers, such that air within a closed space formed between each suction cup and the workpiece is exhausted to a respective air passage by a difference in a pressure between each closed space and said respective air passage.

2. The apparatus of claim 1, wherein a sectional area of each air passage at a portion to which a respective air exhaust passage is connected is less than a sectional area of the air passage around the portion.

3. The apparatus of claim 1, wherein the roller driving unit rotates the plurality of rollers by rotating the plurality of air pipes.

4. The apparatus of claim 1, further comprising a plurality of guide rollers disposed between the rollers for guiding the workpiece.

5. The apparatus of claim 4, wherein each of the guide rollers is connected through a spring to an auxiliary frame that is connected to the support frame.

6. The apparatus of claim 1, wherein the plurality of suction cups are equidistantly disposed about said perimeter of each roller.

7. An apparatus for transmitting a workpiece, comprising:
a support frame;
a support frame driving unit for translating said support frame towards and away from a workpiece;
multiple air pipes coupled to said support frame, wherein said air pipes define air passages there-through;
multiple rollers coupled to said support frame, wherein each roller includes:
a plurality of suction cups disposed about a perimeter of said roller; and
a plurality of air exhaust passages, each fluidly coupling an inner surface of one of said suction cups with one of said air passages;
a roller driving unit configured to rotate each of said rollers about axes perpendicular to a transmitting direction of said workpiece; and
an air flow forming unit fluidly coupled to said air passages and configured to generate a vacuum in each of said air exhaust passages.

8. The apparatus of claim 7, said air flow forming unit is configured to generate a positive airflow through said air exhaust passages.

9. The apparatus of claim 8, wherein each of said air exhaust passages is coupled to a respective one of said air passages at a throat that has a cross-sectional area less than that of said air passages.

10. The apparatus of claim 7, wherein said rollers are fixedly coupled to said air pipes, and said air pipes are rotatably coupled to said support frame, wherein said roller driving unit rotates said rollers by rotating the air pipes.

11. The apparatus of claim 7, further comprising a plurality of guide rollers disposed between the rollers for guiding the workpiece.

12. The apparatus of claim 11, wherein each of the guide rollers is connected through a spring to an auxiliary frame that is coupled to the support frame.

13. The apparatus of claim 7, wherein said suction cups are equidistantly disposed about said perimeter of each of said rollers.

14. The apparatus of claim 7, wherein air pipes are substantially parallel to one another and substantially perpendicular to said transmitting direction.

* * * * *